(12) United States Patent
Lee et al.

(10) Patent No.: US 11,031,638 B2
(45) Date of Patent: Jun. 8, 2021

(54) BATTERY CHARGE CONTROL ALGORITHM

(71) Applicant: LG CHEM, LTD., Seoul (KR)

(72) Inventors: Jong Woo Lee, Cheongju-Si (KR); Seung Jin Noh, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 327 days.

(21) Appl. No.: 16/077,656

(22) PCT Filed: Nov. 8, 2017

(86) PCT No.: PCT/KR2017/012583
§ 371 (c)(1),
(2) Date: Aug. 13, 2018

(87) PCT Pub. No.: WO2018/097512
PCT Pub. Date: May 31, 2018

(65) Prior Publication Data
US 2019/0036176 A1      Jan. 31, 2019

(30) Foreign Application Priority Data
Nov. 24, 2016   (KR) .................. 10-2016-0157525

(51) Int. Cl.
*H01M 10/44*  (2006.01)
*H02J 7/04*   (2006.01)
(Continued)

(52) U.S. Cl.
CPC ....... *H01M 10/443* (2013.01); *H01M 10/425* (2013.01); *H01M 10/44* (2013.01);
(Continued)

(58) Field of Classification Search
CPC .............. H02J 7/00714; H02J 7/00716; H02J 7/007192; H02J 7/007194
See application file for complete search history.

(56) References Cited

U.S. PATENT DOCUMENTS

2004/0124810 A1   7/2004  Smallwood et al.
2005/0134225 A1   6/2005  Mese et al.
(Continued)

FOREIGN PATENT DOCUMENTS

EP     2568564 A1   3/2013
JP    4-229027 A    8/1992
(Continued)

OTHER PUBLICATIONS

Extended European Search Report, dated Sep. 24, 2018, for European Application No. 17873092.5.
(Continued)

*Primary Examiner* — David V Henze-Gongola
(74) *Attorney, Agent, or Firm* — Birch, Stewart, Kolasch & Birch, LLP (57) ABSTRACT

The present disclosure relates to an algorithm for controlling an output specification of a charger according to a battery usage pattern, more particularly, to an algorithm for analyzing a usage pattern of a battery built in a user's system through a self-analysis and controlling a battery charging scheme suitable for the analyzed pattern, thereby extending the service life of the battery.

15 Claims, 3 Drawing Sheets

(51) Int. Cl.
  *H01M 10/48*  (2006.01)
  *H02J 7/00*   (2006.01)
  *H01M 10/42*  (2006.01)

(52) U.S. Cl.
  CPC ......... *H01M 10/48* (2013.01); *H01M 10/486* (2013.01); *H02J 7/00716* (2020.01); *H02J 7/007192* (2020.01); *H02J 7/04* (2013.01); *H01M 2010/4271* (2013.01)

(56) References Cited

U.S. PATENT DOCUMENTS

| | | | |
|---|---|---|---|
| 2011/0267006 A1 | 11/2011 | Tanno | |
| 2013/0063074 A1* | 3/2013 | Lin | H02J 7/00047 320/107 |
| 2016/0031334 A1 | 2/2016 | Marchal et al. | |

FOREIGN PATENT DOCUMENTS

| | | |
|---|---|---|
| JP | 9-51638 A | 2/1997 |
| JP | 2006-512886 A | 4/2006 |
| JP | 2006-304516 A | 11/2006 |
| JP | 2009-162623 A | 7/2009 |
| JP | 2012-029491 A | 2/2012 |
| JP | 2013-38832 A | 2/2013 |
| JP | 2013-059244 A | 3/2013 |
| JP | 2013-207855 A | 10/2013 |
| JP | 2014-193081 A | 10/2014 |
| JP | 2016-513342 A | 5/2016 |
| KR | 10-2015-0118101 A | 10/2015 |

OTHER PUBLICATIONS

International Search Report for PCT/KR2017/012583 (PCT/ISA/210) dated Feb. 13, 2018.

* cited by examiner

BATTERY CHARGE CONTROL ALGORITHM

BACKGROUND

The present disclosure relates to an algorithm for controlling an output specification of a charger according to a battery usage pattern, more particularly, to an algorithm for analyzing a usage pattern of a battery built in a user's system through a self-analysis and controlling a battery charging scheme suitable for the analyzed pattern, thereby extending the service life of the battery.

Users who use IT devices such as mobile phones and laptops consider the portability that they use them anytime and anywhere regardless of time and place. The most influential factor in the portability of IT devices is the battery. Since users want to continue to use IT devices for a longer period of time, the capacity of the battery is an important part.

However, even if the same capacity of the battery is shipped, it is common to see the difference in the usage period. This is because the life span of the battery may be affected by the usage habits of the user or the temperature of the environment when the battery is used for a longer period of time. Accordingly, various technologies are developed to extend the service life of the battery to be a longer time.

Technology for setting the charging voltage/current to a battery without considering the usage habits or environment of the system user, and after reading it from the system, supplying the charging voltage/current corresponding thereto in order for charging in a system charger is applied to conventional battery technology of a system such as a mobile phone, a notebook computer, and the like. However, since the service life of the battery differs depending on the usage habits of the system user and the temperature of the use environment, there is a problem that the service life of the battery may be shortened depending on the user even if the battery is shipped with the same battery capacity. Also, in order to satisfy the desire of users who want to use a battery for a long time, the battery capacity should be increased. However, because of the limitations of battery capacity and battery space available in the system, a user-optimized battery charging technique to extend the service life of the battery is required.

SUMMARY

A battery charging method that does not take into account the usage habits of the user has a problem of shortening the service life of the battery.

Accordingly, the present invention provides a charging control method for extending the service life of a battery by controlling the charging method suitable for the battery usage pattern of a user such as usage habits of the battery user, usage temperature, and the like.

In accordance with an exemplary embodiment, a battery charge control system includes: a battery pack including at least one battery cell; a data measurement unit configured to measure a discharge current, a charge time, a temperature of the battery cell; a data calculation unit configured to calculate an average discharge current rate, an average charge time, and an average temperature of the battery; and a charging mode calculation unit configured to calculate a charging mode of a predetermined battery based on each of the calculated average discharge current rate, average charge time, and average temperature, wherein the data measurement unit includes: a discharge current measurement unit configured to measure a discharge current of a battery cell at predetermined period intervals; a charge time measurement unit configured to measure a time during which the battery is being charged by detecting a time point that the battery is connected to a battery charge device; and a temperature measurement unit configured to measure a temperature of a battery cell at the predetermined period intervals, wherein the data calculation unit includes: an average discharge current calculation unit configured to calculate an average discharge current rate of a battery from a discharge current of a battery cell measured in the discharge current measurement unit; an average charge time calculation unit configured to calculate an average charge time of a battery based on a battery charge time measured in the charge time measurement unit; and an average temperature calculation unit configured to calculate an average temperature of a battery based on a temperature of a battery cell measured in the temperature measurement unit.

The calculation of the predetermined battery charging mode in the charging mode calculation unit may detect a predetermined each section that each of the calculated average discharge current rate, average charge time, and average temperature value of the battery belongs, and derive each division factor corresponding to the detected section to calculate a battery charging mode determined by a combination of each of the derived division factors.

The charging mode calculation unit may perform the battery charging mode calculation periodically at predetermined intervals, and compare each of division factors derived from a previous period with each of division factors derived from a current period, and when the same division factor exists, update the charging mode at the current period by adding a predetermined weight value to the division factor determined to be the same.

In accordance with another exemplary embodiment, a method of controlling charging of a battery configured including at least one battery cell includes: a discharge current measurement operation for measuring a discharge current of the battery cell at predetermined period intervals; a charge time measurement operation for measuring a time during which the battery is being charged by detecting a time point that the battery is connected to a battery charge device; a temperature measurement operation for measuring a temperature of the battery cell at the predetermined period intervals; an average discharge current rate calculation operation for calculating an average discharge current rate of a battery from a discharge current of a battery cell measured at the predetermined period intervals; an average charge time calculation operation for calculating an average charge time of a battery based on the measured charge time of the battery; an average temperature calculation operation for calculating an average temperature of a battery based on the temperature measured at the predetermined period intervals; and a charging mode calculation operation for calculating a predetermined battery charging mode based on each of the calculated average discharge current rate, average charge time, and average temperature of the battery.

The charging mode calculation operation may be performed periodically at the predetermined intervals, and include: detecting a predetermined each section that each of the calculated average discharge current rate, average charge time, and average temperature value of the battery belongs, and deriving each division factor corresponding to the detected section to calculate a battery charging mode determined by a combination of each of the derived division factors.

The charging mode calculation operation may further include a charging mode providing operation for providing the calculated battery charging to the battery charge device.

The charging mode calculation operation may perform the battery charging mode calculation periodically at predetermined intervals, and compare each of division factors derived from a previous period with each of division factors derived from a current period, and when the same division factor exists, update the charging mode at the current period by adding a predetermined weight value to the division factor determined to the same.

The charging mode calculation unit may provide the calculated battery charging mode to a battery charge device.

The battery charge control system may further include a charge control unit, wherein the charging mode calculation unit may provide the calculated battery charging mode to the charge control unit.

The charge control unit may control the battery charge device to operate according to the received battery charging mode.

The charge control unit may receive an output of the battery charge device and convert the output of the battery charge device according to the received battery charging mode to output the converted output to a battery.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, embodiments of the present invention will be described in detail with reference to the accompanying drawings so that those skilled in the art may easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "first," "second," etc., may be used herein to describe various elements, these elements should not be limited by these terms. The above terms are used only to distinguish one component from another. For example, a first component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise.

Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

A battery charge control system includes: a battery pack including at least one battery cell; a data measurement unit configured to measure a discharge current, a charge time, a temperature of the battery cell; a data calculation unit configured to calculate an average discharge current rate, an average charge time, and an average temperature of the battery; and a charging mode calculation unit configured to calculate a charging mode of a predetermined battery based on each of the calculated average discharge current rate, average charge time, and average temperature. The data measurement unit includes: a discharge current measurement unit configured to measure a discharge current of a battery cell at predetermined period intervals; a charge time measurement unit configured to measure a time during which the battery is being charged by detecting a time point that the battery is connected to a battery charge device; and a temperature measurement unit configured to measure a temperature of a battery cell at the predetermined period intervals. The data calculation unit includes: an average discharge current calculation unit configured to calculate an average discharge current rate of a battery from a discharge current of a battery cell measured in the discharge current measurement unit; an average charge time calculation unit configured to calculate an average charge time of a battery based on a battery charge time measured in the charge time measurement unit; and an average temperature calculation unit configured to calculate an average temperature of a battery based on a temperature of a battery cell measured in the temperature measurement unit.

The battery pack according to the present invention may be any IT device including a mobile phone, a notebook computer, etc. where a battery pack is built.

In addition, the term "average", mentioned in this specification, means, for example, an average value obtained by calculating each of the discharge current, the charging time, and the temperature value of the measured battery as an hourly value for 24 hours and calculating the hourly value for 24 hours as a value for one week.

<System>

Hereinafter, a battery charge control system will be described in detail with reference to the drawings, as an embodiment of the present invention.

Figure 1:
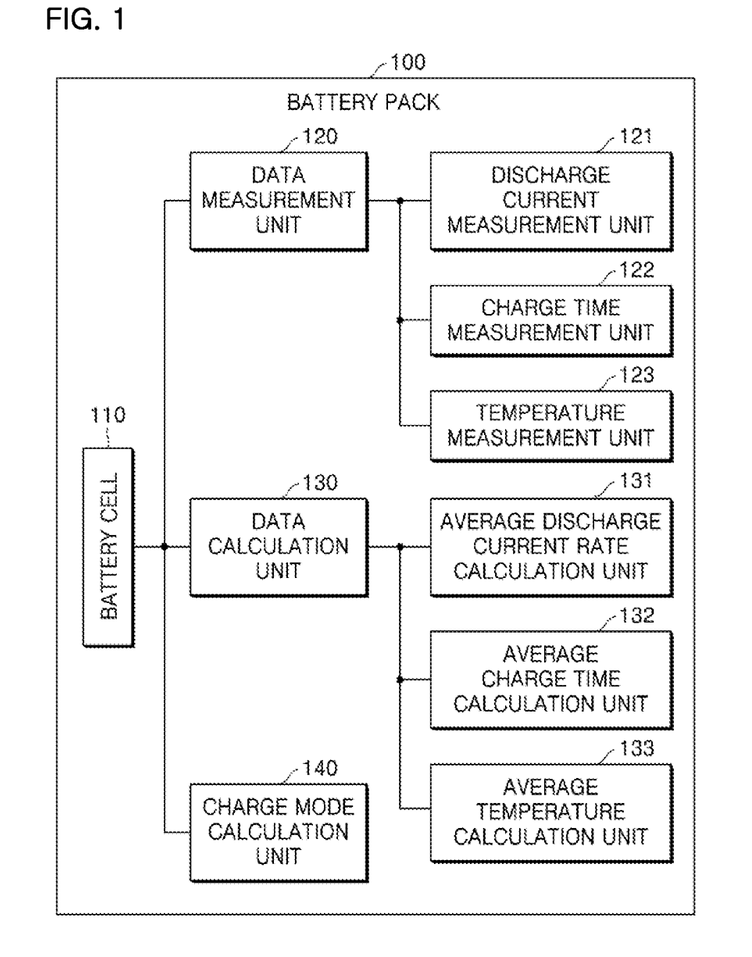
FIG. 1 is a block diagram briefly showing a configuration of a system according to the present invention.

FIG. 1 is a block diagram showing the overall system configuration according to the present invention.

Referring to FIG. 1, a charge control system for a battery according to the present invention includes a battery pack 100, a battery cell 110, a data measurement unit 120, a data calculation unit 130, and a charging mode calculation unit 140.

The battery pack 100 may include at least one or more battery cells 110 connected in series and in parallel.

The data measurement unit 120 may include a discharge current measurement unit 121, a charge time measurement unit 122, and a temperature measurement unit 123.

The discharge current measurement unit 121 may measure the discharge current of the battery cell 110 at predetermined period intervals.

The charge time measurement unit 122 may measure a time during which the battery is being charged. This may detect the connection between the battery and the battery charge device, and measure the time during which the battery is being charged.

The temperature measurement unit 123 may measure the temperature of the battery cell 110 at predetermined period intervals.

The data calculation unit 130 may include an average discharge current rate calculation unit 131, an average charge time calculation unit 132, and an average temperature calculation unit 133.

The average discharge current rate calculation unit 131 may calculate an average discharge current rate based on a discharge current amount measured in the discharge current measurement unit 121 at predetermined period intervals.

For example, the average discharge current rate may be calculated by calculating the discharge current amount as a value for 24 hours, and calculating the value for 24-hour as an average value for one week.

The average charge time calculation unit 132 may calculate an average charge time based on the charge time measured in the charge time measurement unit 122. For example, the measured charge time may be calculated as a value for 24 hours, and based on this, the average charge time for one week may be calculated.

The average temperature calculation unit 133 may calculate the average temperature of the battery pack 100 based on the temperature measured in the temperature measurement unit 123. For example, the temperature measured at predetermined period intervals in the temperature measurement unit 123 may be calculated as a value for 24 hours, and based on this, the average temperature value for one week may be calculated.

The data measurement unit 120 and the data calculation unit 130 may use a gauge IC and may be configured by implementing firmware for measuring the discharge current, the charge time, and the temperature in the gauge IC. Also, the data measurement unit 120 may receive current, voltage, and temperature measurement values of the battery measured from a BMS (not shown) of the battery.

The charging mode calculation unit 140 may calculate a charging mode of the battery based on each of the calculated average discharge current rate, average charge time, and average temperature of the battery.

The charging mode calculation may detect a predetermined section to which each of the calculated average discharge current rate, average charge time, and average temperature value of the battery belongs and may derive each division factor corresponding to the detected predetermined section, thereby calculating the charging mode determined by the combination of each derived division factor.

Also, each division factor calculated in the previous period is compared with each division factor calculated in the current period, and if the same division factor exists, the charging mode calculation unit 140 may update the charging mode in the current period by adding a predetermined weight value to the division factor determined to be the same.

In addition, the charging mode calculation unit 140 may control charging of the battery in a charging mode suitable for the battery state by providing the calculated charging mode to the battery charge device 200.

<Method>

Figure 2:
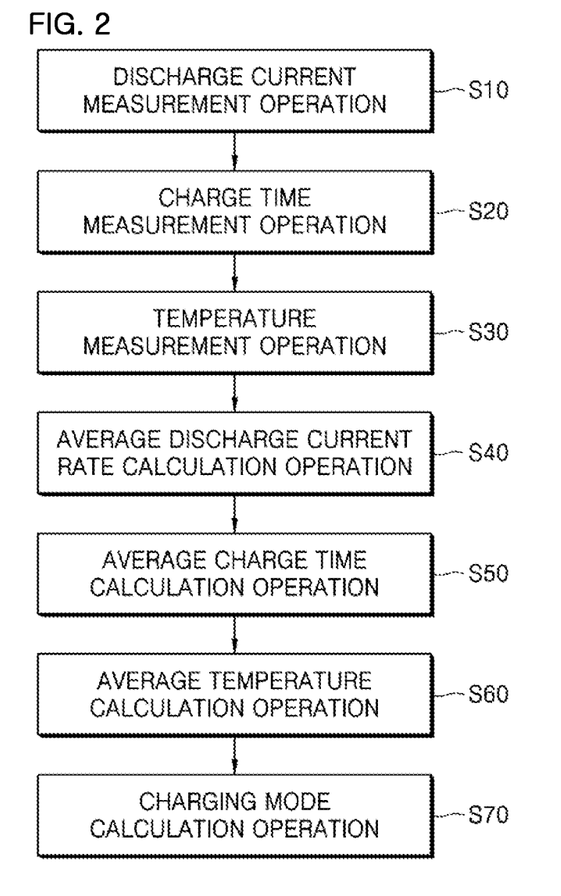
FIG. 2 is a block diagram briefly showing an operation according to the present invention.

Hereinafter, a battery charge control method according to the present invention will be described with reference to FIG. 2.

A method of controlling charging of a battery configured including at least one battery cell includes: a discharge current measurement operation S10 for measuring a discharge current of the battery cell at predetermined period intervals; a charge time measurement operation S20 for measuring a time during which the battery is being charged by detecting a time point that the battery is connected to a battery charge device; a temperature measurement operation S30 for measuring a temperature of the battery cell at the predetermined period intervals; an average discharge current rate calculation operation S40 for calculating an average discharge current rate of a battery from a discharge current of a battery cell measured at the predetermined period intervals; an average charge time calculation operation S50 for calculating an average charge time of a battery based on the measured charge time of the battery; an average temperature calculation operation S60 for calculating an average temperature of a battery based on the temperature measured at the predetermined period intervals; and a charging mode calculation operation S70 for calculating a predetermined battery charging mode based on each of the calculated average discharge current rate, average charge time, and average temperature of the battery.

The discharge current measurement operation S10 may be an operation of measuring a discharge current of the battery cell 110 at predetermined period intervals.

The charge time measurement operation S20 may measure the time during which the battery is being charged by detecting the time point when the battery charge device is connected to the charge device.

The temperature measurement operation S30 may measure the battery cell 110 at predetermined period intervals.

The average discharge current rate calculation operation S40 may calculate an average discharge current rate of the battery based on a discharge current amount of the battery cell measured in the discharge current measurement operation S10. For example, the discharge current amount may be calculated as an hourly discharge current value for 24 hours, and based on this, an average discharge current amount for a week may be calculated.

The average charge time calculation operation S50 may calculate an average charge time based on the charge time of the battery measured in the charge time measurement operation S20. For example, the charge time may be calculated as a value for 24 hours, and based on this, the average charge time of the battery may be calculated by calculating the average value for one week.

The average temperature calculation operation S60 may calculate the average temperature of the battery based on the temperature measured in the temperature measurement operation S30. For example, the temperature of the battery may be calculated as a value for 24 hours, and based on this, the average temperature of the battery may be calculated by calculating the average value for one week.

The above operations may be performed in a gauge IC, and may be configured by implementing firmware for measuring the discharge current, charge time, and temperature in the gauge IC.

The charging mode calculation operation S70 may detect each predetermined section to which each calculated average discharge current rate, average charge time, and average temperature value of the battery belongs, and derive each division factor corresponding to the detected section. Therefore, the charging mode of the battery corresponding to the combination of the derived division factors may be calculated.

Also, the charging mode calculation operation S70 may provide the calculated charging mode to the battery charge device 200.

To describe the method of calculating the charging mode, the description will be made with reference to a table according to an embodiment of the present invention.

First, as shown in Table 1, the user mode may be defined according to the manner in which the battery is used by the user.

TABLE 1

| User classification | Major usage pattern | Improvement plan |
| --- | --- | --- |
| Power User (Heavy Load) | Mainly high current use Pattern (3D, game, etc.) | Need to Improve battery life by lowering charge voltage/current |
| Normal User (Middle Load) | General use pattern (Office workers, etc.) | After analyzing user's usage pattern, 1) Need to improve by lowering charge voltage/current 2) Automatic charge/discharge for capacity loss and accurate capacity estimation of battery by self-discharge |
| Commercial User (Light Load) | Pattern using plugged-in charger always | 1) Automatic charge/discharge for battery capacity loss and accurate capacity measurement due to self-discharge 2) Set the charge/discharge area to use only between 40% and 80% of RSOC |

A division factor for each range may be calculated by referring to Table 2 to 4 below.

TABLE 2

|  | 0.4 C-rate or less | Between 0.4-0.8 C rate | 0.8 C rate or more |
| --- | --- | --- | --- |
| Discharge current rate | A | B | C |

TABLE 3

|  | 56 hours or less | Between 56-84 hours | 84 hours or more |
| --- | --- | --- | --- |
| Charge time | A' | B' | C' |

TABLE 4

|  | 20 degrees or less | Between 20-40 degrees | 40 degrees or more |
| --- | --- | --- | --- |
| Temperature | A" | B" | C" |

As shown in Table 2 to 4, by setting a division factor for each discharge current rate, charge time, and temperature of the battery, each division factor corresponding to a predetermined section to which each average value calculated for the one week belongs may be calculated.

The charging mode for charge control suitable for a battery state may be calculated by using each division factor corresponding to the predetermined calculated section.

The method for calculating the charging mode may be performed by referring to Table 5 below.

TABLE 5

| NO. | Discharge current rate | Charge time | Temperature | Corresponding mode |
| --- | --- | --- | --- | --- |
| 1 | A | A' | A" | M |
| 2 | A | A' | B" | M |
| 3 | B | A' | C" | H |
| 4 | A | B' | A" | M |
| 5 | C | B' | B" | H |

As shown in Table 5, the charging mode of the battery may be calculated by a combination of respective division factors corresponding to the calculated average discharge current rate, average charge time, and average temperature of the battery.

Also, referring to Table 6 below, the charging method of the battery corresponding to each charging mode calculated in the charging mode calculation operation S70 is set.

TABLE 6

| User mode classification | Improvement method | Charge setting change |
| --- | --- | --- |
| Heavy User Mode | Need to change charge voltage/current | 1) Charging voltage: lowered to 0.1 V (per cell) 2) Charging current: changed to 0.5 C rate |
| Middle User Mode | Same before/after change | Same before/after change |
| Light User Mode | Need to set to improve battery capacity by self-discharge and use battery only in stable area | 1) Charge up to 80% after charge/discharge automatically when system and adapter are connected 2) Set charge/discharge area to use only between 40% and 80% of RSOC (Charging up to 80%, discharge up to 40%) |

In this manner, by setting a charging method suitable for each calculated charging mode, the charging of the battery may be controlled through the charging method corresponding to the calculated charging mode. Therefore, the service life of the battery may be prolonged as it is controllable by the charging method according to the state of the battery.

Also, each division factor calculated in the previous period is compared with each division factor calculated in the current period, and if the same division factor exists, the charging mode calculation operation S70 may update the charging mode in the current period by adding a predetermined weight value to the division factor determined to be the same.

Updating the charging mode by adding a predetermined weight value may be performed as shown in Table 7 below.

TABLE 7

|  | Week | | | |
| --- | --- | --- | --- | --- |
|  | First week | Second week | Third week | Fourth week |
| Weight | 1 | 1.2 | 1.4 | 1.6 |

When the same division factors exist continuously, the table 7 shows weight values set according to the period thereof. For example, if there is a division factor that is the same as the previous period (e.g., first week) in the division factors calculated in the current period (e.g., second week), the charging mode may be updated by adding a corresponding weight value of 1.2 to the division factor determined to be the same.

After the weight value is given as described above and the charging mode is updated, if there is a division factor that is the same as the previous period (e.g., second week) of the division factor calculated in the current period (e.g., third week), the charging mode may be updated by adding the corresponding weight value of 1.4.

That is, when the user patterns are continuous identically, the charging mode is updated by assigning a weight value set differently according to successive periods, it is possible to control the charging of the battery by determining the user pattern with more improved accuracy.

Embodiment 2

According to the embodiment 2 of the present invention, the battery charge control system may be additionally configured with a charge control unit 210.

The charge control unit 210 may control the battery charge device according to a battery charging mode provided from the charging mode calculation unit 140.

Figure 3:
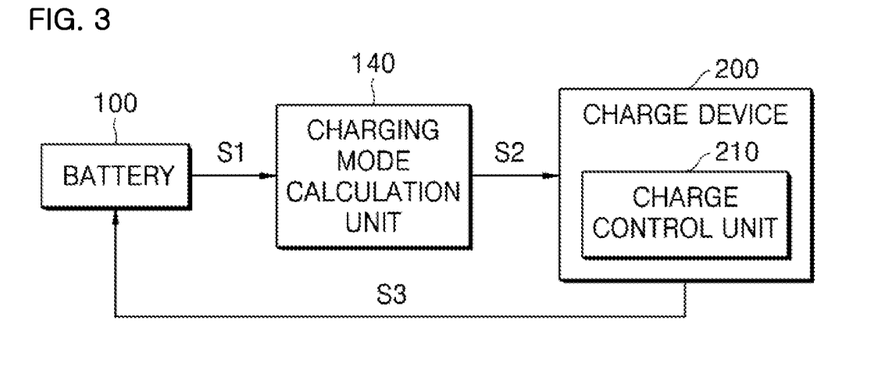
FIG. 3 is a view showing embodiment 3 according to the present invention.

Referring to FIG. 3, the embodiment 3 of the present invention is a view briefly showing that the charge control unit 210 is configured in the battery charge device 200 to control the charging of the battery.

As in operations S1 and S2, the process of calculating the charging mode is the same as that described above with reference to FIGS. 1 and 2, and will be omitted. The charging mode of the battery calculated in the charging mode calculation unit 140 may be provided to the battery charge device 200 as in operation S2. Therefore, by controlling the output of the current of the battery charge device 200 according to the charging mode of the battery, the charge control unit 210 configured in the battery charge device 200 may control the charging of the battery with the output according to the calculated charging mode of the battery as in operation S3.

Embodiment 4

Figure 4:
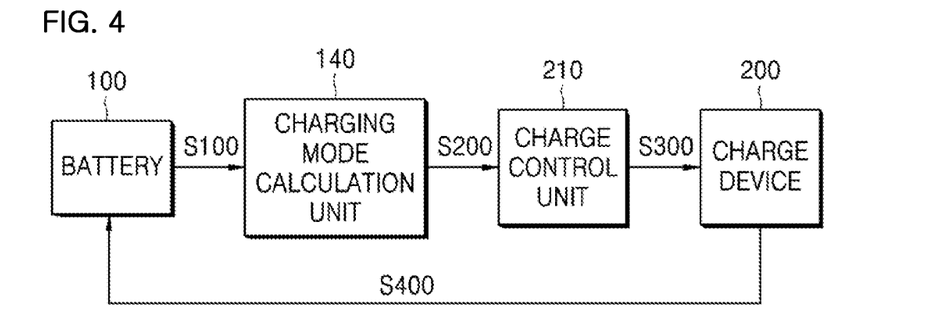
FIG. 4 is a view showing embodiment 4 according to the present invention.

Referring to FIG. 4, the embodiment 4 is a view briefly showing that the charge control unit 210 is configured outside the battery charge device to control the charging of the battery.

As in operations S100 and S200, the process of calculating the charging mode of the battery is the same as that described above with reference to FIGS. 1 and 2, and will be omitted.

As in operation S200, the charging mode of the battery calculated in the charging mode calculation unit 140 may be inputted to the charge control unit 210 outside the battery charge device.

Accordingly, the charge control unit 210 may control the output current of the battery charge device 200 to be converted according to the received charging mode. Therefore, the battery charge device 200 may control the charging of the battery as in operation S300 by outputting the charging current according to the calculated charging mode.

Embodiment 5

Figure 5:
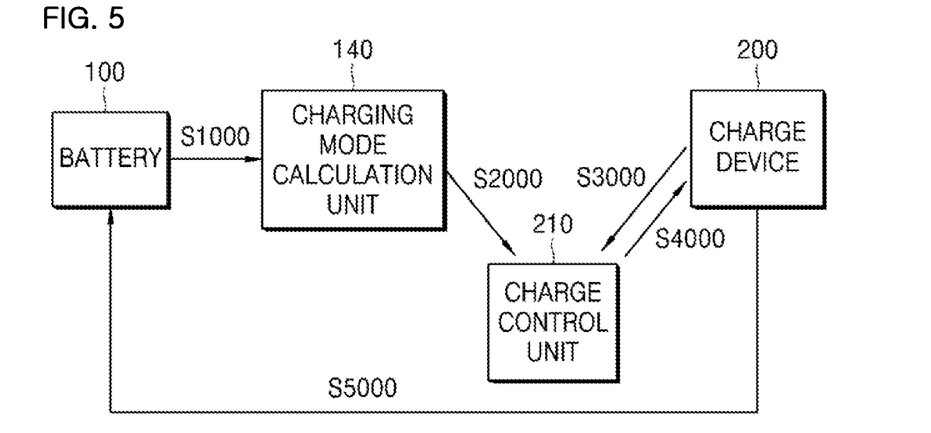
FIG. 5 is a view showing embodiment 5 according to the present invention.

Referring to FIG. 5, the battery charge control operation according to the embodiment 5 will be described. As in operations S1000 and S2000, the process of calculating the battery charging mode is the same as that described above with reference to FIGS. 1 and 2, and will be omitted. The charging mode calculation unit 140 may calculate a battery charging mode and provide it to the charge control unit 210. Also, as in operation S3, the charge control unit 210 may receive the output of the battery charge device 200. Accordingly, the charge control unit 140 may convert the received output current of the battery charge device according to the provided battery charging mode, as in operation S4000 and output it to the battery as in operation S5000. Therefore, the charging of the battery may be controlled according to the calculated charging mode of the battery.

The present invention has the effect of extending the service life of a battery by measuring the battery usage pattern and the usage environment temperature of a system user such as a mobile phone and a notebook computer and calculating a suitable charging mode to control the charging of the battery.

Although the algorithm for controlling an output specification of a charger has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A battery charge control system, comprising:
a battery including at least one battery cell;
a data measurement gauge integrated circuit (IC) configured to:
measure a discharge current of the battery at predetermined intervals,
measure a charge time during which the battery is being charged by detecting a time point that the battery is connected to a battery charge device, and
measure a temperature of the at least one battery cell at the predetermined intervals:
a data calculation gauge IC configured to:
calculate an average discharge current rate from the measured discharge current of the battery,
calculate an average charge time from the measured charge time of the battery, and
calculate an average temperature of the battery from the measured temperature of the battery; and
a charging mode calculation gauge IC configured to calculate a charging mode of the battery by:
designating division factors for each of the average discharge current rate, the average charge time and the average temperature;
determining the division factor among the division factors for each of the average discharge current rate, the average charge time and the average temperature; and
calculating the charging mode based on the determined division factor for each of the average discharge current rate, the average charge time and the average temperature.

2. The system of claim 1, wherein the charging mode calculation gauge IC calculates the charging mode periodically at the predetermined intervals, and compares division factors determined from a previous period with division factors determined from a current period, and when the same division factor exists for the previous period and the current period, the calculation gauge IC updates the charging mode at the current period by adding a predetermined weight value to the division factors determined to be the same.

3. The system of claim 1, wherein the charging mode calculation gauge IC provides the calculated battery charging mode to the battery charge device.

4. The system of claim 1, wherein the division factors for the average discharge current rate include:
a first division factor of 0.4 C or less;
a second division factor above 0.4 C and below 0.8 C; and
a third division factor of 0.8 C or more.

5. The system of claim 1, wherein the division factors for the average charge time include:
a first division factor of 56 hours or less;
a second division factor of greater than 56 hours and less than 84 hours; and
a third division factor of 84 hours or more.

6. The system of claim 1, wherein the division factors for average temperature include:
a first division factor of 20 degrees Celsius or less;
a second division factor of greater than 20 degrees Celsius and less than 40 degrees Celsius; and
a third division factor of 40 degrees Celsius or more.

7. The system of claim 1, wherein the division factors for the average discharge current rate include:
a first division factor of 0.4 C or less;
a second division factor above 0.4 C and below 0.8 C; and
a third division factor of 0.8 C or more,
wherein the division factors for the average charge time include:
a first division factor of 56 hours or less;
a second division factor of greater than 56 hours and less than 84 hours; and
a third division factor of 84 hours or more, and
wherein the division factors for average temperature include:
a first division factor of 20 degrees Celsius or less;
a second division factor of greater than 20 degrees Celsius and less than 40 degrees Celsius; and
a third division factor of 40 degrees Celsius or more.

8. A method of controlling charging of a battery including at least one battery cell, the method comprising:
measuring a discharge current of the battery at predetermined intervals;
measuring a charge time during which the battery is being charged by detecting a time point that the battery is connected to a battery charge device;
measuring a temperature of the battery at the predetermined intervals;
calculating an average discharge current rate of the battery from the measured discharge current of the battery;
calculating an average charge time of the battery from the measured charge time of the battery;
calculating an average temperature of the battery from the measured temperature measured at the predetermined period intervals; and
calculating a charging mode of the battery by:
designating division factors for each of the average discharge current rate, the average charge time and the average temperature;
determining the division factor among the division factors for each of the average discharge current rate, the average charge time and the average temperature; and
calculating the charging mode based on the determined division factor for each of the average discharge current rate, the average charge time and the average temperature.

9. The method of claim 8, wherein the calculating of the charging mode is performed at the predetermined intervals.

10. The method of claim 8, further comprising providing the calculated battery charging mode to the battery charge device.

11. The method of claim 9, wherein the calculating the charging mode includes comparing each of division factors determined from a previous period with division factors determined from a current period, and when the same division factor exists for the previous period and the current period, updating the charging mode at the current period by adding a predetermined weight value to the division factors determined to be the same.

12. The method of claim 8, wherein the division factors for the average discharge current rate include:
a first division factor of 0.4 C or less;
a second division factor above 0.4 C and below 0.8 C; and
a third division factor of 0.8 C or more.

13. The method of claim 8, wherein the division factors for the average charge time include:
a first division factor of 56 hours or less;
a second division factor of greater than 56 hours and less than 84 hours; and
a third division factor of 84 hours or more.

14. The method of claim 8, wherein the division factors for average temperature include:
a first division factor of 20 degrees Celsius or less;
a second division factor of greater than 20 degrees Celsius and less than 40 degrees Celsius; and
a third division factor of 40 degrees Celsius or more.

15. The method of claim 8, wherein the division factors for the average discharge current rate include:
a first division factor of 0.4 C or less;
a second division factor above 0.4 C and below 0.8 C; and
a third division factor of 0.8 C or more,
wherein the division factors for the average charge time include:
a first division factor of 56 hours or less;
a second division factor of greater than 56 hours and less than 84 hours; and
a third division factor of 84 hours or more, and
wherein the division factors for average temperature include:
a first division factor of 20 degrees Celsius or less;
a second division factor of greater than 20 degrees Celsius and less than 40 degrees Celsius; and
a third division factor of 40 degrees Celsius or more.

* * * * *